(12) United States Patent
Kern

(10) Patent No.: US 8,947,784 B2
(45) Date of Patent: Feb. 3, 2015

(54) VARIABLE FOCUS LENS HAVING TWO LIQUID CHAMBERS

(75) Inventor: Thomas Kern, Feuerthalen (CH)

(73) Assignee: Optotune AG, Dietikon (CH)

( * ) Notice: Subject to any disclaimer, the term of this patent is extended or adjusted under 35 U.S.C. 154(b) by 0 days.

(21) Appl. No.: 13/823,034

(22) PCT Filed: Oct. 26, 2010

(86) PCT No.: PCT/CH2010/000270
§ 371 (c)(1),
(2), (4) Date: Jun. 4, 2013

(87) PCT Pub. No.: WO2012/055049
PCT Pub. Date: May 3, 2012

(65) Prior Publication Data
US 2013/0265647 A1      Oct. 10, 2013

(51) Int. Cl.
*G02B 3/14*       (2006.01)
*B29D 11/00*    (2006.01)
*G02B 26/00*    (2006.01)

(52) U.S. Cl.
CPC ............... *G02B 3/14* (2013.01); *G02B 26/004* (2013.01); *B29D 11/00403* (2013.01)
USPC .............................. 359/666; 359/665; 264/1.6

(58) Field of Classification Search
CPC ... G02B 3/14; G02B 26/004; B29D 11/00403
USPC .............................. 264/1.6; 359/665, 666, 667
See application file for complete search history.

(56) References Cited

U.S. PATENT DOCUMENTS

| 60,109 A | 11/1866 | Woodward |
| 2,062,468 A | 12/1936 | Matz et al. |
| 4,494,826 A | 1/1985 | Smith |
| 4,572,616 A | 2/1986 | Kowel et al. |
| 4,783,153 A | 11/1988 | Kushibiki et al. |
| 4,783,155 A | 11/1988 | Imataki et al. |
| 4,802,746 A | 2/1989 | Baba et al. |

(Continued)

FOREIGN PATENT DOCUMENTS

| EP | 2075630 A1 | 7/2009 |
| GB | 1327503 A | 8/1973 |

(Continued)

OTHER PUBLICATIONS

International Search Report and Written Opinion of the ISA for PCT/CH2010/000270, mailed May 31, 2011.

(Continued)

*Primary Examiner* — David N Spector
(74) *Attorney, Agent, or Firm* — Marshall, Gerstein & Borun LLP

(57) ABSTRACT

A variable focus lens has a housing (1) and an actuator (8) which are mutually displaceable along an optical axis (A) of the lens. A primary membrane (15) is arranged between a first chamber (24, 26) and a second chamber (30, 32), with the first and second chambers being filled with liquids of similar density but different indices of refraction. First and second auxiliary membranes (19, 17) are provided for volume compensation. The first auxiliary membrane (19) forms a wall section of the first chamber (24, 26), and the second auxiliary membrane (17) forms a wall section of the second chamber (30, 32), at least one or both of the auxiliary membranes facing environmental air at its outer side.

19 Claims, 1 Drawing Sheet

(56) References Cited

U.S. PATENT DOCUMENTS

| | | |
|---|---|---|
| 5,138,494 A | 8/1992 | Kurtin |
| 5,438,486 A | 8/1995 | McNair |
| 5,774,273 A | 6/1998 | Bornhorst |
| 5,917,657 A | 6/1999 | Kaneko et al. |
| 5,999,328 A | 12/1999 | Kurtin et al. |
| 6,040,947 A | 3/2000 | Kurtin et al. |
| 6,538,823 B2 | 3/2003 | Kroupenkine et al. |
| 6,542,309 B2 | 4/2003 | Guy |
| 6,715,876 B2 | 4/2004 | Floyd |
| 6,859,333 B1 | 2/2005 | Ren et al. |
| 6,864,951 B1 | 3/2005 | Ren et al. |
| 7,079,203 B1 | 7/2006 | Huang et al. |
| 7,085,065 B2 | 8/2006 | Silver |
| 7,209,280 B2 | 4/2007 | Goossens |
| 7,382,976 B1 | 6/2008 | Mok et al. |
| 7,643,217 B2 | 1/2010 | Yokoyama et al. |
| 7,672,059 B2 | 3/2010 | Batchko et al. |
| 7,675,686 B2 | 3/2010 | Lo et al. |
| 7,697,214 B2 | 4/2010 | Batchko et al. |
| 7,768,712 B2 | 8/2010 | Silver et al. |
| 7,826,145 B2 | 11/2010 | Justis et al. |
| 7,920,330 B2 | 4/2011 | Aschwanden et al. |
| 8,000,022 B2 | 8/2011 | Niederer |
| 8,363,330 B2 | 1/2013 | Bolis et al. |
| 2002/0118464 A1 | 8/2002 | Nishioka et al. |
| 2002/0154380 A1 | 10/2002 | Gelbart |
| 2003/0147046 A1 | 8/2003 | Shadduck |
| 2004/0001180 A1 | 1/2004 | Epstein |
| 2004/0174610 A1 | 9/2004 | Aizenberg et al. |
| 2005/0030438 A1 | 2/2005 | Nishioka |
| 2005/0100270 A1 | 5/2005 | O'Connor et al. |
| 2006/0045501 A1 | 3/2006 | Liang et al. |
| 2006/0061729 A1 | 3/2006 | Shadduck |
| 2006/0087614 A1 | 4/2006 | Shadduck |
| 2006/0164593 A1 | 7/2006 | Peyghambarian et al. |
| 2006/0164731 A1 | 7/2006 | Wu et al. |
| 2007/0201138 A1 | 8/2007 | Lo |
| 2007/0263293 A1 | 11/2007 | Batchko et al. |
| 2008/0112059 A1 | 5/2008 | Choi et al. |
| 2008/0144185 A1 | 6/2008 | Wang et al. |
| 2008/0204909 A1 | 8/2008 | Shiota et al. |
| 2008/0252960 A1 | 10/2008 | Hendriks et al. |
| 2008/0259463 A1 | 10/2008 | Shepherd |
| 2009/0052049 A1 | 2/2009 | Batchko et al. |
| 2009/0303613 A1 | 12/2009 | Kinoshita et al. |
| 2009/0310209 A1 | 12/2009 | Aschwanden et al. |
| 2010/0118414 A1 | 5/2010 | Bolis |
| 2010/0202054 A1 | 8/2010 | Niederer |
| 2010/0232030 A1 | 9/2010 | Dobrusskin |
| 2011/0149410 A1 | 6/2011 | Blum |

FOREIGN PATENT DOCUMENTS

| | | |
|---|---|---|
| JP | 60-220301 A | 11/1985 |
| JP | 1-166003 A | 6/1989 |
| JP | 1-166004 A | 6/1989 |
| JP | 8-114703 A | 5/1996 |
| JP | 10-144975 A | 5/1998 |
| JP | 11-133210 A | 5/1999 |
| JP | 2000-81504 | 3/2000 |
| JP | 2002-131513 A | 5/2002 |
| JP | 2002-357774 A | 12/2002 |
| JP | 2003-114309 A | 4/2003 |
| JP | 2008-58841 | 3/2008 |
| WO | WO-0214926 A2 | 2/2002 |
| WO | WO-2005/040909 A1 | 5/2005 |
| WO | WO-2005/085930 A1 | 9/2005 |
| WO | WO-2008138010 A1 | 11/2008 |
| WO | WO-2009021344 A1 | 2/2009 |
| WO | WO-2011150526 | 12/2011 |

OTHER PUBLICATIONS

Zhang et al., "Fluidic adaptive lens with high focal length turnability", *Applied Physics letter*, 82(19): 3171-3172 (2003).

Duncan Graham-Rowe, "Liquid lenses make a splash", *Nature Publishing Group*, pp. 2-4 (2006).

Schneider et al., "Adaptive Fluidic PDMS-Lens with Integrated Piezoelectric Actuator", *MEMS*, pp. 120-123 (2008).

Ren et al., "Tunable-focus liquid lens controlled using a servo motor", *Optical Society of America*, 14(18): 8031-8036 (2006).

"We are now poLight", *poLight*, 3 pages (2008).

Binh-Khiem et al., "Polymer thin film deposited on liquid for varifocal encapsulated liquid lenses," *Applied Physics Letter* 93:124101-1-124102-2 (2008).

U.S. Appl. No. 60/226,174, filed Aug. 15, 2000.

Translation of the Notification of Reasons for Refusal (Type I Office Action) mailed Aug. 4, 2014.

VARIABLE FOCUS LENS HAVING TWO LIQUID CHAMBERS

TECHNICAL FIELD

The invention relates to a variable focus lens having a first and a second chamber filled with liquids having different indices of refraction. The two chambers are separated by a primary membrane. The lens comprises a housing and an actuator. An axial movement of the actuator with respect to the housing causes the primary membrane to be deformed.

The invention also relates to a method for manufacturing such a lens.

BACKGROUND ART

A lens of this type is shown in WO 2008/020356. The lens has two hermetically sealed chambers filled with different liquids of differing refractive indices but with similar density. The chambers are separated by a deformable membrane. An advantage of this design lies in the reduction of membrane deformations caused by gravity. However, the design described in WO 2008/020356 requires an indirect force transmission through a magnetic field to the membrane because the actuator is not readily accessible. In addition, manufacturing this type of lens is difficult. In particular, it has been found to be difficult to remove residual air from the chambers.

DISCLOSURE OF THE INVENTION

The problem to be solved by the present invention is to provide a lens that can be manufactured more easily. This problem is solved by the lens of claim 1.

Accordingly, the lens comprises a first chamber filled with a first liquid and a second chamber filled with a second liquid, wherein said second liquid has different optical properties, in particular a different index of refraction, from said first liquid. A primary membrane separates said first from said second chamber and is in contact with said first and second liquid. The primary membrane forms a lens surface intersecting the optical axis of the variable focus lens. A first auxiliary membrane forms a first wall section of the first chamber and a second auxiliary membrane forms a first wall section of said second chamber. The lens comprises a housing forming a second wall section of at least said first and/or said second chamber. The lens further comprises an actuator connected to at least one of said membranes. The actuator and the housing are mutually displaceable in a direction parallel to the optical axis, wherein a mutual displacement of the actuator and the housing causes said membranes to deform, thereby changing the focal length of the lens.

At least one of said auxiliary membranes is facing environmental air, which allows residual air from at least one chamber to escape by means of diffusion through the auxiliary membrane. Residual air from the other chamber can escape through the auxiliary membrane of said other chamber if said auxiliary membrane is also facing air, or it can escape through the primary or auxiliary membrane during the manufacturing process while only the other chamber is filled. To accelerate the air diffusion process, heating, vacuum or a small-molecular process gas such as $CO_2$ can be used during manufacturing.

Advantageously, the lens comprises a foil that forms the primary as well as the auxiliary membranes, i.e. all the membranes are formed by a single foil. This greatly simplifies the manufacturing process.

The foil and/or any of the membranes can be attached to the housing in a prestretched manner to prevent wrinkling during actuation and to further reduce gravitational effects.

In an advantageous embodiment, the housing comprises a holder connected to the primary membrane in a first region, which first region extends around the optical axis of the lens. In that case, it is particularly advantageous to arrange the first and second auxiliary membranes radially outside said holder, i.e. at a larger radial distance from the optical axis than the holder, thereby separating the optically relevant part of the primary membrane from the optically irrelevant parts of the auxiliary membranes.

The method for manufacturing the lens advantageously comprises the steps of filling said second liquid into the second chamber,
    removing any residual gas from the second chamber by using diffusion of the gas through the foil,
    filling said first liquid into the first chamber, and
    removing any residual gas from the first chamber by using diffusion of the gas through the foil,
    wherein said foil forms said membranes.

This method takes advantage of the fact that, at least in certain steps of the manufacturing process, each chamber is in contact with the environment through the foil, thus that residual gas can diffuse through the foil and thus leave the liquid. During production it is also possible to fill the liquid in the foil in a deformed state of the foil, and then seal it by attaching the chamber to the filled foil, whereupon the foil relaxes while the trapped gas exits from the chamber by diffusion through the foil.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

Definitions

The term "radial" is understood to designate a direction perpendicular to the optical axis of the lens.

The term "axial" is understood to designate a direction parallel to the optical axis of the lens.

The terms "rigid" and "flexible" are used in relation to each other. The membranes of the lens are by at least one order of magnitude more flexible and less rigid than the housing and the actuator.

The term "liquid" designates a non-gaseous, substance capable of flowing, such as water, oils, etc. The term also includes highly viscous liquids. Further examples of liquids are given below.

First Embodiment

Figure 1:
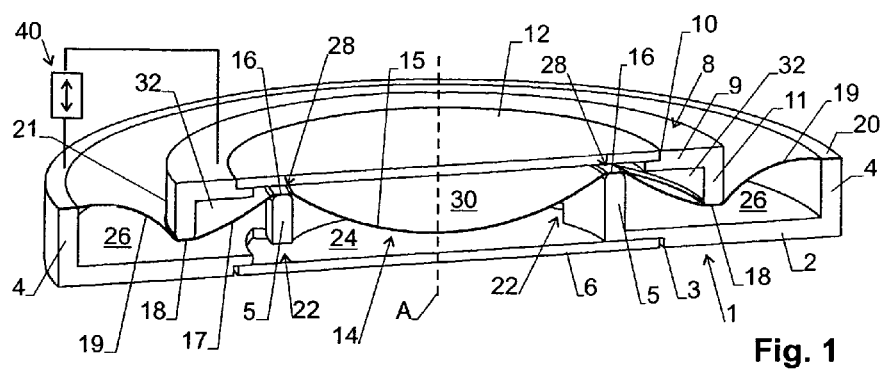
FIG. 1 shows a sectional, perspective view of a first embodiment of a variable focus lens.

The embodiment of a variable focus lens of FIG. 1 is of substantially rotational-symmetric design in respect to an optical axis A. It comprises a housing 1 having a radially extending bottom section 2 with a first circular opening 3, a cylindrical, axially extending outer wall 4 and a cylindrical, axially extending inner wall or holder 5. A transparent first window 6 is held in housing 1 and closes first circular opening 3.

The lens further comprises an actuator 8 having a radially extending top section 9 with a second circular opening 10 and a cylindrical, axially extending outer wall 11. A transparent second window 12 is held in actuator 8 and closes second circular opening 10. The transparent second window 12 and the top section 9 can also be made out of one material and be one single component.

A flexible, elastic foil 14 extends between housing 1 and actuator 8 and forms a plurality of membranes. These membranes include:

A primary membrane 15 suspended in holder 5 of housing 1. Primary membrane 15 is connected at an annular first region 16 to the top end of holder 5 of housing 1.

A first auxiliary membrane 19, which is substantially annular and extends between a second region 18 and a third region 20, with the second region 18 being formed by the bottom end of outer wall 11 of actuator 8 and the third region 20 being formed by the top end of outer wall 4 of housing 1.

A second auxiliary membrane 17, which is substantially annular and extends between first region 16 and the second region 18.

First region 16, where primary membrane 15 and second auxiliary membrane 17 are connected to holder 5, extends around optical axis A. It forms a sealing connection between primary membrane 15 and holder 5, as well as between second auxiliary membrane 17 and holder 5.

Second region 18, where first and second auxiliary membrane 17, 19 are connected to actuator 8, also extends around optical axis A and forms a sealing connection between actuator 8 and both auxiliary membranes 17, 19.

Third region 20, finally, where first auxiliary membrane 19 is connected to housing 1, also extends around optical axis A and forms a sealing connection between housing 1 and first auxiliary membrane 19.

As can be seen from FIG. 1, second region 18 is at a larger distance from optical axis A than first region 16, and third region 20 is at a larger distance from optical axis A than second region 18. All regions 16, 18, 20 are, in the present embodiment, substantially concentric to axis A and give rise to an annular layout of the first and second auxiliary membranes 19, 17.

The first and third regions 16, 20 are advantageously in a common plane extending perpendicularly to optical axis A, thereby making it easier to attach the foil forming the membranes to housing 1. The axial position of second region 18 in respect to this plane depends on the mutual positions of actuator 8 and housing 1.

At least one passage 22 is formed in holder 5 or between holder 5 and first window 6, providing a communication between a space 24 between primary membrane 15 and window 6 and at least a space 26 between first auxiliary membrane 19 and housing 1. (In the present embodiment, space 26 also extends into a region between second auxiliary membrane 17 and housing 1.) Similarly, at least one passage 28 is formed between the top of holder 5 of housing 1 and the actuator 8 or second window 12, providing a communication between a space 30 between primary membrane 15 and second window 12 and a space 32 between second auxiliary membrane 17 and actuator 8.

The spaces 24 and 26 together form a "first chamber", while the spaces 30 and 32 together form a "second chamber". First chamber 24, 26 is filled with a first liquid having a first refractive index and second chamber 30, 32 is filled with a second liquid having a second, different refractive index. Both liquids advantageously have substantially equal densities, i.e. densities that differs not more than 20%, in particular not more than 10% and advantageously but not necessary, the two liquids are immiscible Actuator 8 is displaceable, along optical axis A, with respect to housing 1. For this purpose, a mechanism 40 can be provided, which moves housing 1 or actuator 8, or both. Mechanism 40 can be a manually operated mechanism or an electrically operated mechanism. The electrically operated mechanism can include one or more of the following actuator types:

electromagnetic actuators
piezo actuators
screw drive actuators
electroactive polymer actuators
electrostatic actuators
linear motors
stepper motors
electro motors When actuator 8 is displaced axially with respect to housing 1, the volumes of spaces 26 and 32 vary oppositely, which in turn causes the first and second liquid to flow radially in or out of the spaces 24, 30, respectively, thereby giving rise to a change of deformation of primary membrane 15. This allows to change the focal length of the lens.

As can be seen from FIG. 1, first auxiliary membrane 19 is arranged at a larger radial distance from optical axis A than second auxiliary membrane 17.

First auxiliary membrane 19 is bordering, at its top side, on environmental air, while its bottom side faces the first liquid. It forms a first wall section of first chamber 24, 26.

Second auxiliary membrane 17 is bordering, at its top side, on the second liquid, while its bottom side is in contact with the first liquid. It forms a first wall section of second chamber 30, 32. In the embodiment of FIG. 1, it also forms a wall section of first chamber 24, 26.

In particular, at least one of the auxiliary membranes 19, 17, advantageously both auxiliary membranes 19, 17, is/are in contact with the environment by means of a suitable opening 21 in or between housing 1 and/or holder 8.

Housing 1 forms a second wall section of first chamber 24, 26, namely with its bottom wall 2, and its outer wall 4. Window 6 forms a third wall section of first chamber 24, 26.

Similarly, actuator 8 forms a second wall section of second chamber 30, 32, namely with its top wall 9 and its outer wall 11, while window 12 finally forms a third wall section of second chamber 30, 32.

Hence, first chamber 24, 26 as well as second chamber 30, 32 are surrounded by rigid wall sections (formed by housing 1, actuator 8 and their windows 6 and 12, respectively), as well as by flexible wall sections formed by the auxiliary membranes. Upon displacement of actuator 8 in respect to housing 1, the distances between the rigid walls of each chamber changes, and the auxiliary membranes are deformed in order to maintain a constant volume in both chambers, thereby displacing liquid into or from the spaces 24, 30 and deforming primary membrane 15.

Second Embodiment

Figure 2:
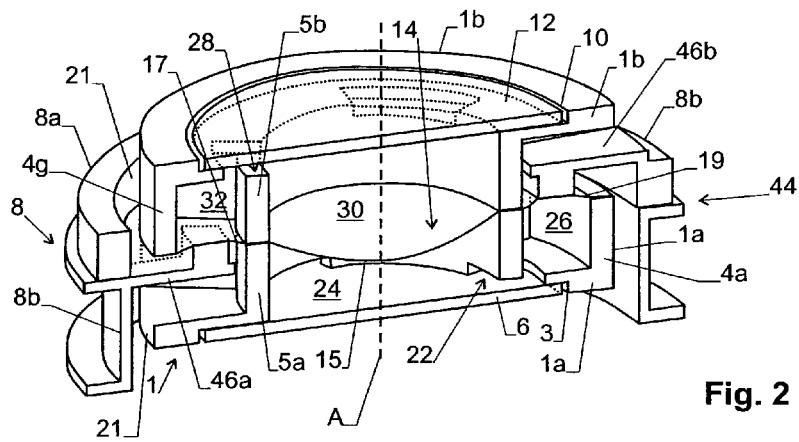
FIG. 2 shows a sectional, perspective view of a second embodiment of a variable focus lens.
Figure 3:
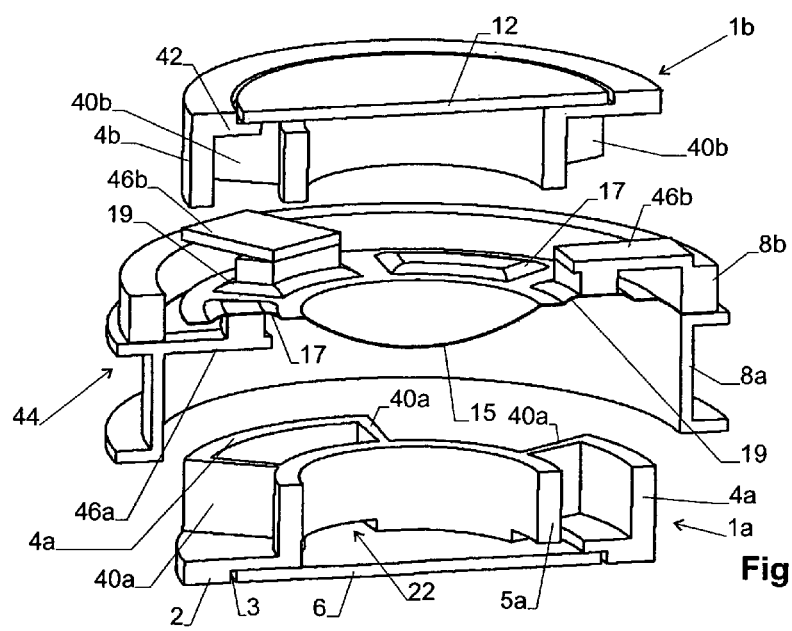
FIG. 3 shows the lens of FIG. 2 in exploded view.

A second embodiment is shown in FIGS. 2 and 3. In the following, only the differences with respect to the first embodiment are described.

In the first embodiment the first and second auxiliary membranes 19, 17 are not arranged in an annular layout with one membrane at a larger distance from axis A than the other. Rather, as shown in FIGS. 2 and 3, the first and second auxiliary membranes 19, 17 are arranged on a common annular region in alternating fashion when viewed in azimuthal direction. They are meeting at radial wall sections 40a, 40b of housing 1.

As can be seen, housing 1 has two-part form, with a first, bottom section 1a and a second, top section 1b rigidly connected to each other, with the foil forming the membranes arranged between them. Both sections 1a, 1b together form holder 5 by means of inner wall sections 5a, 5b. The radial sections 40a, 40b are extending radially away from inner wall sections 5a, 5b, respectively.

Each pair of two wall sections 40a is interconnected by an outer wall section 4a, and each pair of two wall sections 40b is interconnected by an outer wall section 4b. Thus, several spaces 26 and 32 are formed. Each space 26 is enclosed by two radial wall sections 40a, their connecting outer wall section 4a, bottom 2 and first auxiliary membrane 19. Each space 32 is enclosed by two radial wall sections 40b, their connecting outer wall section 4b, a top section 42 of housing 1, as well as second auxiliary membrane 17.

Hence, in this design, there are several spaces 26 and several spaces 32, and several first and second auxiliary membranes 19, 17. On one side, each auxiliary membrane is facing environmental air, while, on the other side, it is facing its respective liquid. Namely, the first auxiliary membranes 19 are facing air on their top sides, and the second auxiliary membranes 17 are facing air on their bottom sides.

Again, passages 22 and 28 are provided for connecting the central spaces 24 and 30 to the spaces 26 and 32, respectively.

Actuator 8 is also made of two parts 8a, 8b, respectively, which are fixedly connected to each other. It forms an annular body 44, from which a plurality of arms 46a, 46b extends inwards between the radial wall sections 40a, 40b, respectively for contacting the first and second auxiliary membranes 19 and 17. In the embodiment of FIGS. 2 and 3, there is a set of bottom arms 46a mounted to bottom part 8a of actuator 8, which is connected to the bottom sides of the second auxiliary membranes 17, and there is a set of top arms 46b mounted to top part 8b of actuator, which is connected to the top sides of the first auxiliary membranes 19.

In contrast to the embodiment of FIG. 1, both windows 6 and 12 are connected to housing 1, i.e. the lens has constant axial extension even when changing its focal length. It is also possible to have housing 1 and window 12 to be only one part.

Each window 6, 12 again forms a "third wall section" for its respective first and second chamber, with the first wall section being formed by the auxiliary membranes 19 or 17 and the second wall section by housing 1. The advantage of this embodiment is a more compact radial design and the separation of the lens section from the moveable actuator.

NOTES

In the embodiments above, the variable focus lens is of substantially rotational-symmetric design. In particular, the central region covered by the primary membrane is rotational-symmetric with respect to the optical axis of the lens, thereby providing a lens with rotationally-symmetric properties. It must be noted, though, that different designs can be used. In particular, there is no strict need for a rotational-symmetric design in the region of the auxiliary membranes. The auxiliary membranes can also be placed at any radial and axial distance from the primary membrane and completely or partially surround the primary membrane. Also, e.g. for a cylindrical lens, the region of the primary membrane is typically not rotational-symmetric.

In the above embodiments, actuator 8 is connected to both of the auxiliary membranes. However, e.g. in the embodiment of FIGS. 2 and 3, it may also be connected to only one of them.

Materials and manufacturing methods as suggested in the following hold for all embodiments described in the FIGS. 1 to 3.

Optionally, the housing 1, actuator 8 and windows 6 and 12 can contain optical elements with suitable shapes e.g. be:
  Spherical lenses (convex and concave);
  Fresenel lenses;
  Cylindrical lenses;
  Aspherical lenses (convex and concave);
  Flat;
  Mirrors;
  Squares, triangles, lines or pyramids;
  Any micro- (e.g. micro lens array, diffraction grating, hologram) or nano- (e.g. antireflection coating) structure can be integrated into the housing 1, windows 6 and 12 and actuator 8 and the flexible foil 14. When an anti-reflective layer is applied to at least one surface of the flexible foil, it is advantageously formed by fine structures having a size smaller than the wavelength of the transmitted light. Typically, this size may be smaller than 5 µm for infrared applications, smaller than 1 µm for near-infrared applications, and smaller than 200 nm for applications using visible light.

Any of the following methods can e.g. be used to form the anti-reflection coating:
  Casting, in particular injection molding/mold processing;
  Nano-imprinting, e.g. by hot embossing nanometer-sized structures;
  Etching (e.g. chemical or plasma);
  Sputtering;
  Hot embossing;
  Soft lithography (i.e. casting a polymer onto a pre-shaped substrate);
  Chemical self-assembly (see e.g. "Surface tension-powered self-assembly of microstructures—the state-of-the-art", R. R. A. Syms, E. M. Yeatman, V. M. Bright, G. M. Whitesides, Journal of Microelectro-mechanical Systems 12(4), 2003, pp. 387-417);
  Electro-magnetic field guided pattern forming (see e.g. "Electro-magnetic field guided pattern forming", L. Seemann, A. Stemmer, and N. Naujoks, Nano Lett., 7 (10), 3007-3012, 2007. 10.1021/nl0713373).

The material for the housing 1, actuator 8 and windows 6 and 12 can e.g. comprise or consist of:
  PMMA;
  Glass;
  PS;
  Plastic;
  Polymer;
  Crystalline material, in particular single crystal material.
  Metals Any of the following methods can e.g. be applied for forming and structuring the housing 1, actuator 8 and windows 6 and 12:
  Grinding;
  Injection molding;
  Milling;
  Casting.

The material for the first and second liquids can be transparent, semi-transparent, absorbing or reflecting and e.g. comprise or consist of:

Oils;
Solvents;
Ionic liquids;
Liquid metals
Dispersions

The material for the elastic foil 14 can e.g. comprise or consist of:
Gels (Optical Gel OG-1001 by Liteway™),
Elastomers (TPE, LCE, Silicones e.g. PDMS Sylgard 186, Acrylics, Urethanes);
Thermoplast (ABS, PA, PC, PMMA, PET, PE, PP, PS, PVC, . . . );

The adjustable optical lens can be used in a large variety of applications, such as:
Projection devices, e.g. for applications in the optical part of projectors for macro- and micro-projectors in beamers and hand-held devices;
Displays; Microscopes;
Cameras; Surveillance cameras;
Vision systems, having any kind of camera;
In research applications;
Phoropters
Lens assemblies
Lighting applications such as illumination for shops, retail, museums or home applications;
Telecommunication applications (amplitude modulation).

Advantageously, foil 14 is permeable or semi-permeable for gases, in particular for the gas used as environmental gas during manufacturing, such that bubbles of gas enclosed in the first or second chamber can easily diffuse through the membranes.

While there are shown and described presently preferred embodiments of the invention, it is to be distinctly understood that the invention is not limited thereto but may be otherwise variously embodied and practiced within the scope of the following claims.

The invention claimed is:

1. A variable focus lens comprising
a first chamber filled with a first liquid,
a second chamber filled with a second liquid, wherein said second liquid has different optical properties from said first liquid,
a primary membrane separating said first and said second chamber and in contact with said first and second liquid, said primary membrane forming a lens surface intersecting an optical axis of said variable focus lens,
a first auxiliary membrane forming a first wall section of said first chamber,
a second auxiliary membrane forming a first wall section of said second chamber,
a housing forming a second wall section of at least said first and/or said second chamber, and
an actuator connected to at least one of said auxiliary membranes,
wherein at least one of said auxiliary membranes is facing environmental air,
wherein said primary membrane as well as said auxiliary membranes are formed by a foil which is permeable or semi-permeable to gases, and
wherein said actuator and said housing are mutually displaceable in a direction parallel to said optical axis, wherein a mutual displacement of said actuator and said housing causes said membranes to deform, thereby changing a focal point of the lens.

2. A variable focus lens comprising
a first chamber filled with a first liquid,
a second chamber filled with a second liquid, wherein said second liquid has different optical properties from said first liquid,
a foil that is permeable or semi-permeable to gases, the foil forming:
a primary membrane separating said first and said second chamber and in contact with said first and second liquid, said primary membrane forming a lens surface intersecting an optical axis of said variable focus lens,
a first auxiliary membrane forming a first wall section of said first chamber, and
a second auxiliary membrane forming a first wall section of said second chamber,
a housing forming a second wall section of at least said first and/or said second chamber, and
an actuator connected to at least one of said membranes,
wherein at least one of said auxiliary membranes is facing environmental air, and
wherein said actuator and said housing are mutually displaceable in a direction parallel to said optical axis, wherein a mutual displacement of said actuator and said housing causes said membranes to deform, thereby changing a focal length of the lens.

3. The lens of claim 2 wherein at least one of the auxiliary membranes is connected to the environment by means of an opening in or between said housing and/or a holder.

4. The lens of claim 2 wherein the primary membrane and/or the auxiliary membranes is/are prestretched.

5. The lens of claim 2 wherein the first and second liquids are immiscible.

6. The lens of claim 2 wherein said first and said second auxiliary membranes are arranged at a radial distance from said optical axis.

7. The lens of claim 2 wherein said first auxiliary membrane is arranged at a larger radial distance from said optical axis than said second auxiliary membrane.

8. The lens of claim 2 wherein said second wall section of said first chamber is formed by said housing and wherein said second wall section of said second chamber is formed by said actuator.

9. The lens of claim 2 further comprising
a first window forming a third wall section of said first chamber and being mounted to said housing and
a second window forming a third wall section of said second chamber and being mounted to said actuator.

10. A method for fabricating the variable focus lens of claim 2, the method comprising steps of
filling said second liquid into the second chamber,
removing residual gas from the second chamber by using diffusion of the gas through the foil,
filling said first liquid into the first chamber, and
removing residual gas from the first chamber by using diffusion of the gas through the foil,
wherein said foil forms said membranes.

11. The lens of claim 2 wherein said actuator is connected to at least one of said auxiliary membranes.

12. The lens of claim 11 wherein said actuator is connected to said first and said second auxiliary membrane.

13. The lens of claim 2 wherein said housing comprises a holder connected to said primary membrane in a first region extending around said optical axis.

14. The lens of claim 13 wherein said actuator is connected to said first and said second auxiliary membrane in a second region extending around said optical axis, wherein said second region is at a larger distance from said optical axis than said first region.

15. The lens of claim 14 wherein said housing is connected to said first auxiliary membrane in a third region extending around said optical axis, and wherein said third region is at a larger distance from said optical axis than said second region.

16. The lens of claim 15 wherein said first and third regions are located in a common plane extending perpendicularly to said optical axis.

17. The lens of claim 2 wherein said first and said second auxiliary membranes are arranged in an annular region around said optical axis, and wherein said first and second auxiliary membranes are meeting at radial wall sections of said housing.

18. The lens of claim 17 wherein said actuator comprises arms extending radially inwards between said radial wall sections and contacting said first and/or second auxiliary membrane.

19. The lens of claim 17 wherein said housing comprises a first section and a second section with a foil forming the membranes arranged between the first section and the second section.

* * * * *